United States Patent
Fontaine et al.

(10) Patent No.: US 9,246,642 B2
(45) Date of Patent: Jan. 26, 2016

(54) METHOD OF COMMUNICATION ADAPTED TO THE TRANSMISSION OF DATA PACKETS

(75) Inventors: Patrick Fontaine, Rennes (FR); Renaud Dore, Rennes (FR); Ludovic Jeanne, Rennes (FR)

(73) Assignee: THOMSON LICENSING, Boulogne-Billancourt (FR)

( * ) Notice: Subject to any disclaimer, the term of this patent is extended or adjusted under 35 U.S.C. 154(b) by 1175 days.

(21) Appl. No.: 11/820,981

(22) Filed: Jun. 20, 2007

(65) Prior Publication Data

US 2008/0002659 A1 Jan. 3, 2008

(30) Foreign Application Priority Data

Jun. 30, 2006 (FR) ...................... 06 52747

(51) Int. Cl.
*H04J 3/24* (2006.01)
*H04L 1/20* (2006.01)
*H04L 1/00* (2006.01)

(52) U.S. Cl.
CPC .............. *H04L 1/20* (2013.01); *H04L 1/0034* (2013.01); *H04L 1/0003* (2013.01); *H04L 1/0009* (2013.01); *H04L 1/0025* (2013.01); *H04L 1/0026* (2013.01); *H04L 2001/0092* (2013.01)

(58) Field of Classification Search
CPC . H04L 1/20; H04L 1/0034; H04L 2001/0092; H04L 1/0025; H04L 1/0026; H04L 1/0003; H04L 1/0009
USPC .................. 370/252, 437, 465, 474
See application file for complete search history.

(56) References Cited

U.S. PATENT DOCUMENTS

| 5,592,468 | A  | * | 1/1997  | Sato ............................. 370/252 |
| 6,084,919 | A  | * | 7/2000  | Kleider et al. ................ 375/285 |
| 6,262,994 | B1 | * | 7/2001  | Dirschedl et al. ............. 370/465 |
| 6,330,278 | B1 | * | 12/2001 | Masters et al. ................ 375/223 |
| 6,643,322 | B1 |   | 11/2003 | Varma et al. |
| 6,650,624 | B1 | * | 11/2003 | Quigley et al. ............... 370/252 |
| 6,879,561 | B1 |   | 4/2005  | Zhang et al. |

(Continued)

FOREIGN PATENT DOCUMENTS

| EP | 1513281 | 3/2005 |
| EP | 1858188 | 11/2007 |

(Continued)

OTHER PUBLICATIONS

Li-Chun Wang et al.: "Cross-layer goodput analysis for rate adaptive IEEE 802.11a WLAN in the generalized Nakagami fading channel" Communications, 2004 IEEE International Conference on Paris, France Jun. 20-24, 2004, Piscataway, NJ USA, IEEE, Jun. 20, 2004, pp. 2313-2313, figures 2-4.

(Continued)

*Primary Examiner* — Jay P Patel
(74) *Attorney, Agent, or Firm* — Tutunjian & Bitetto, P.C.

(57) ABSTRACT

The invention relates to a method of communication adapted to the transmission of data packets that can be transmitted according to various physical modes.
In order to optimize transmission, the method comprises the following steps:
 reception of packets, each packet being sent in at least one radio burst associated with a physical mode chosen from a set of at least two physical modes;
 estimation of the packet error rate for each physical mode of the set.

25 Claims, 4 Drawing Sheets

(56) References Cited

U.S. PATENT DOCUMENTS

Figure 1:
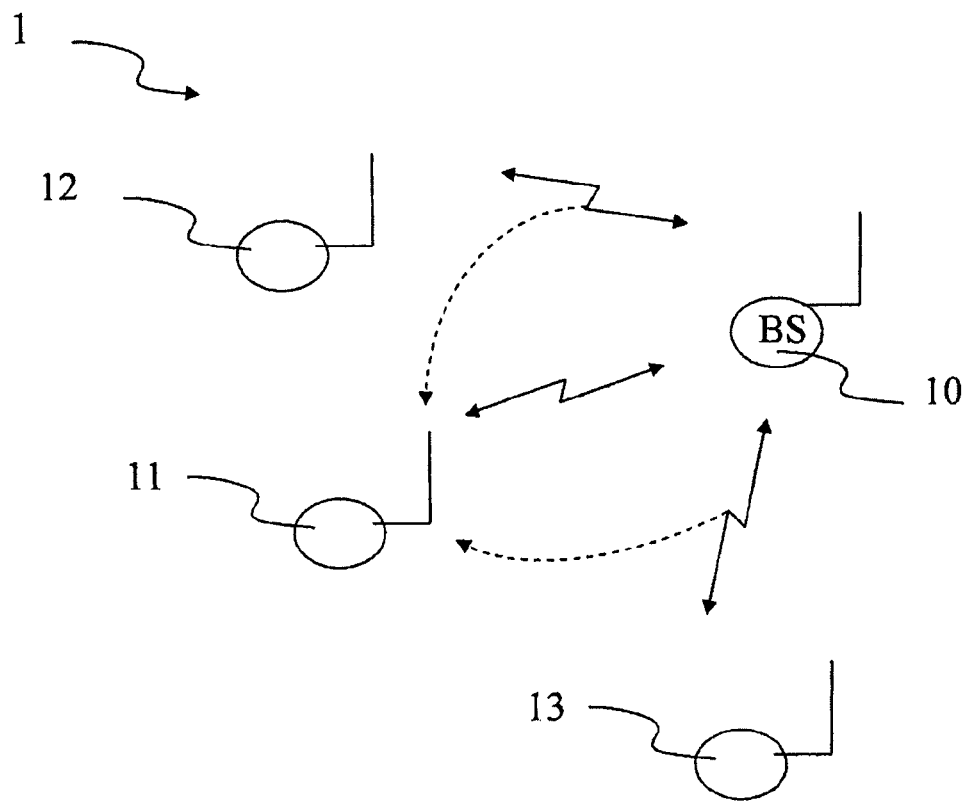

| | | | |
|---|---|---|---|
| 6,965,616 B1* | 11/2005 | Quigley et al. | 370/480 |
| 6,985,465 B2* | 1/2006 | Cervello et al. | 370/333 |
| 6,985,513 B2* | 1/2006 | Zeira | 375/147 |
| 7,042,963 B1* | 5/2006 | Raith et al. | 375/341 |
| 7,106,968 B2* | 9/2006 | Lahav et al. | 398/47 |
| 7,139,283 B2* | 11/2006 | Quigley et al. | 370/432 |
| 7,254,373 B2* | 8/2007 | Paljug et al. | 455/90.3 |
| 7,315,542 B2* | 1/2008 | Gil et al. | 370/392 |
| 7,315,967 B2* | 1/2008 | Azenko et al. | 714/704 |
| 7,474,718 B2* | 1/2009 | Liu | 375/344 |
| 7,512,154 B2* | 3/2009 | Quigley et al. | 370/468 |
| 7,519,082 B2* | 4/2009 | Quigley et al. | 370/468 |
| 7,525,988 B2 | 4/2009 | Kim | |
| 7,672,381 B1* | 3/2010 | Kleider et al. | 375/260 |
| 7,688,788 B2* | 3/2010 | Gefflaut et al. | 370/332 |
| 7,688,886 B2* | 3/2010 | Kohyama | 375/232 |
| 7,706,338 B2* | 4/2010 | Kondylis et al. | 370/338 |
| 7,720,020 B2* | 5/2010 | Larsson | 370/315 |
| 7,843,847 B2* | 11/2010 | Quigley et al. | 370/252 |
| 7,889,692 B2* | 2/2011 | Bi et al. | 370/328 |
| 2001/0055319 A1* | 12/2001 | Quigley et al. | 370/480 |
| 2002/0060995 A1* | 5/2002 | Cervello et al. | 370/332 |
| 2003/0031198 A1* | 2/2003 | Currivan et al. | 370/465 |
| 2003/0031275 A1* | 2/2003 | Min et al. | 375/326 |
| 2003/0125066 A1* | 7/2003 | Habetha | 455/522 |
| 2004/0076138 A1* | 4/2004 | Serceki et al. | 370/349 |
| 2004/0147289 A1* | 7/2004 | Paljug et al. | 455/562.1 |
| 2004/0170431 A1* | 9/2004 | Maciocco et al. | 398/48 |
| 2005/0002375 A1* | 1/2005 | Gokhale et al. | 370/347 |
| 2005/0039103 A1* | 2/2005 | Azenko et al. | 714/776 |
| 2005/0054296 A1 | 3/2005 | Chuang et al. | |
| 2005/0073989 A1 | 4/2005 | Wang et al. | |
| 2005/0083897 A1 | 4/2005 | Terry et al. | |
| 2005/0085236 A1 | 4/2005 | Gerlach et al. | |
| 2005/0113099 A1 | 5/2005 | Eriksson et al. | |
| 2005/0159166 A1 | 7/2005 | Jonsson et al. | |
| 2005/0198362 A1* | 9/2005 | Navada et al. | 709/236 |
| 2005/0260998 A1 | 11/2005 | Casaccia et al. | |
| 2005/0265268 A1 | 12/2005 | Erup et al. | |
| 2006/0029023 A1* | 2/2006 | Cervello et al. | 370/333 |
| 2006/0034233 A1 | 2/2006 | Strutt et al. | |
| 2006/0088056 A1* | 4/2006 | Quigley et al. | 370/468 |
| 2006/0109799 A1* | 5/2006 | Tseng et al. | 370/254 |
| 2006/0153152 A1* | 7/2006 | Kondylis et al. | 370/338 |
| 2006/0159120 A1* | 7/2006 | KIm | 370/465 |
| 2006/0198460 A1* | 9/2006 | Airy et al. | 375/267 |
| 2006/0209898 A1* | 9/2006 | Abdelilah et al. | 370/477 |
| 2007/0081462 A1* | 4/2007 | Gefflaut et al. | 370/235 |
| 2007/0126612 A1* | 6/2007 | Miller | 341/67 |
| 2007/0160082 A1* | 7/2007 | Un et al. | 370/469 |
| 2007/0160083 A1* | 7/2007 | Un et al. | 370/470 |
| 2007/0160213 A1* | 7/2007 | Un et al. | 380/270 |
| 2007/0162610 A1* | 7/2007 | Un et al. | 709/230 |
| 2007/0230408 A1* | 10/2007 | Trainin et al. | 370/338 |
| 2008/0037622 A1* | 2/2008 | Kohyama | 375/232 |
| 2008/0253349 A1* | 10/2008 | Yu | 370/345 |
| 2009/0003234 A1* | 1/2009 | Fu et al. | 370/252 |
| 2012/0188901 A1* | 7/2012 | Struhsaker et al. | 370/252 |

FOREIGN PATENT DOCUMENTS

| | | |
|---|---|---|
| JP | 2000217159 | 8/2001 |
| JP | 2004140726 | 5/2004 |
| JP | 2004343559 | 12/2004 |
| WO | W02100025 | 12/2002 |
| WO | WO2005122497 | 12/2005 |

OTHER PUBLICATIONS

Search Report dated Oct. 9, 2006.

Kim, J., "A link adaptation approach to multimedia data transmission in wireless home networks", Advanced Communication Technology International Conf., 2005, pp. 564-566.

Bougard, B., "Energy efficiency of the IEEE 802.15.4 standard in dense wirelss microsensor networks: Modelling and Improvement Perspectives", 2005 IEEE Proceedings of the Design, Automation and Test in Europe Conference and Exhibition, 2005, pp. 1-6.

Kusuma, T., "Utilizing perceptual image quality metrics for link adaptation based on religion of interest", Wireless Communication Systems, Sep. 5, 2005, pp. 1-5.

Rohani, B., "Application of a perceptual speech quality metrics for link adaptation in wireless systems" Proc. 1st Int. Symposium on Wireless Communication Systems, pp. 260-264, IEEE, Piscataway, NJ ((2004)).

Bandinelli, "A link adaptation strategy for QoS support in IEEE 802.11e-based WLANs", Wireless Communications and Networking Conference, 2005 IEEE, vol. 1, Mar. 13, 2005, pp. 120-125.

Ji et al., "Rate-adaptive transmission over correlated fading channels", IEEE Transactions on Communication, vol. 53, No. 10, Oct. 2005, pp. 1663-1670.

Luo W. Et. Al., "Delay Analysis of selective-repeat ARQ with applications to link adaptation in wireless packet data systems", IEEE Transactions on Wireless Communications, vol. 4, No. 3, May 2005, pp. 1017-1029.

Braskich, T et al., "Optimization of a link adaptation algorithm for voice over wireless LAN application", Wireless Communications and Networking Conference, 2005 IEEE, vol. 3, Mar. 13, 2005, pp. 1602-1607.

Jostchulte, K. et al., "Enhancement of wireless LAN for multimedia home networking", IEEE Transactions on Consumer Electronics, vol. 51, vol. 1, Feb. 2005, pp. 80-86.

Moon, J. et al., "A framework design for the next-generation radio access system", IEEE Journal on Selected Areas in Communications, vol. 24, No. 3, Mar. 2006, pp. 554-564.

Chevillat, et al., "Dynamic data rate and transmit power adjustment in IEEE 802.11 wireless LANs", International Journal of wireless information networks, Vol. 12, N°3, Jul. 2005, pp. 123-145.

Lee et al., "Analysis of throughput and efficient block size based polling scheme for IEEE 802.11e wireless LANs", 2005 IEEE International Conference on Communications, May 16, 2005, vol. 5, pp. 3467-3473.

Haratcherev et al., "Fast 802.11 link adaptation for real-time video streaming by cross-layer signaling", 2005 IEEE International Symposium on Circuits and Systems, May 23, 2005, vol. 4, pp. 3523-3526.

Ramachandran et al., "A link adaptation algorithm for IEEE 802.16", 2005 IEEE Wireless Communications and Networking Conference, Mar. 13, 2005, New Orleans, Louisiana, USA, pp. 1466-1471.

Yomo et al., "PHY and MAC performance evaluation of IEEE 802.11a WLAN over fading channels", IETI Journal of Research, vol. 51, No. 1, 2005, pp. 1-10.

Anonymous, "IEEE 802.16-IEEE Standard for Local and metropolitan area networks Part 16: Air Interface for Fixed Broadband Wireless Access Systems", Oct. 1, 2004, pp. 1-893.

* cited by examiner

METHOD OF COMMUNICATION ADAPTED TO THE TRANSMISSION OF DATA PACKETS

This application claims the benefit, under 35 U.S.C. §119 of France Patent Application 0652747, filed 30 Jun. 2006.

1. FIELD OF THE INVENTION

The present invention relates to the field of digital telecommunications and more precisely the transmission of packets at high-throughput on channels that are noisy and/or subject to interference.

2. TECHNOLOGICAL BACKGROUND

According to the state of the art, the transmission of data packets on a wireless link varies greatly in quality. In order to maximize the throughput of a communication, it is possible to implement link adaptation mechanisms.

Thus, patent document U.S. Pat. No. 6,643,322 filed in the name of Aperto Networks, Inc. describes a communication system allowing the use of several types of modulations and therefore making it possible to choose a spectral efficiency (that is to say the number of useful bits transmitted per second and per hertz) on the basis of the correctly received or erroneous packets. Thus, if the number of consecutive packet acknowledgements exceeds a certain threshold, the modulation parameters are modified to allow an immediately higher spectral efficiency. If, conversely, the number of consecutive packets that are not acknowledged exceeds a certain limit, the modulation parameters are modified to allow an immediately lower spectral efficiency.

This technique presents the drawback of not being fully adapted to the quality of a communication channel that is noisy and/or subject to interference.

3. SUMMARY OF THE INVENTION

The invention is aimed at alleviating these drawbacks of the prior art.

More particularly, the objective of the invention is to improve the performance of a communication system while remaining relatively simple to implement.

For this purpose, the invention proposes a method of communication adapted to the transmission of data packets that can be transmitted according to various physical modes. In order to improve transmission performance, the method comprises the following steps:

reception of packets, each packet being sent in at least one radio burst associated with a physical mode chosen from a set of at least two physical modes;

estimation of the packet error rate for each physical mode of the set.

The set of at least two physical modes corresponds to the set of the possible physical modes or to a subset.

Advantageously, at least some of the packets received are not intended for the apparatus that receives the packets and estimates the error rate on the basis of the packets.

Thus, the terminal implementing the method can have a very good estimate of the transmission channel for the set of physical modes considered.

According to advantageous characteristics, the physical mode comprises the modulation and/or the rate of an error correcting code and/or the type of an error correcting code.

According to a particular characteristic, the estimation of the error rate comprises an error detection code verification step.

According to an advantageous characteristic, the method comprises a step of transmitting a cue representative of the packet error rate for each physical mode, the cue representative of the rate being transmitted to a station that is able to send radio bursts intended for the terminal.

Advantageously, the method comprises a step for determining statistical data regarding error rates for packets received on the basis of the estimation of the packet error rate and of at least one parameter associated with a physical mode.

According to a particular characteristic, the method comprises a step of transmitting cues representative of the statistical data, the cue representative of the statistical data being transmitted to a station that is able to send radio bursts intended for the terminal.

According to a particular characteristic, the method comprises a step of estimating a signal-to-noise ratio on the basis of the estimation of the packet error rate and of at least one parameter associated with a physical mode.

According to another characteristic, the method comprises a step of transmitting data representative of a signal-to-noise ratio for at least some of the physical modes of the set, these data being transmitted to a station that is able to send radio bursts intended for the terminal.

According to a particular embodiment, the transmission of data packets is performed in accordance with a protocol of the IEEE 802.16 type.

According to an advantageous characteristic, the method comprises a step of transmitting a physical mode modification request for the transmission of data packets.

4. LIST OF FIGURES

Figure 4:
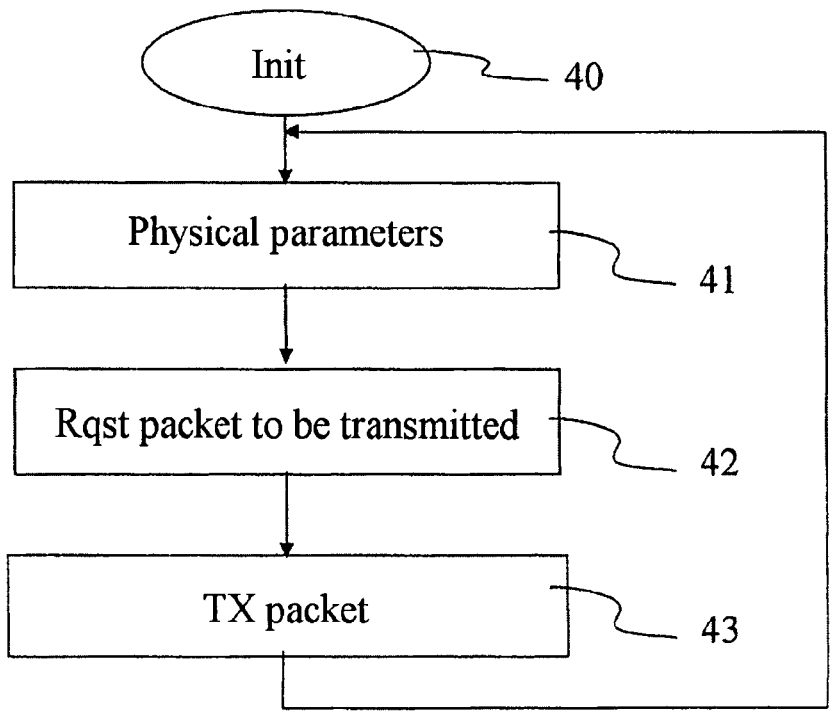
Figure 2:
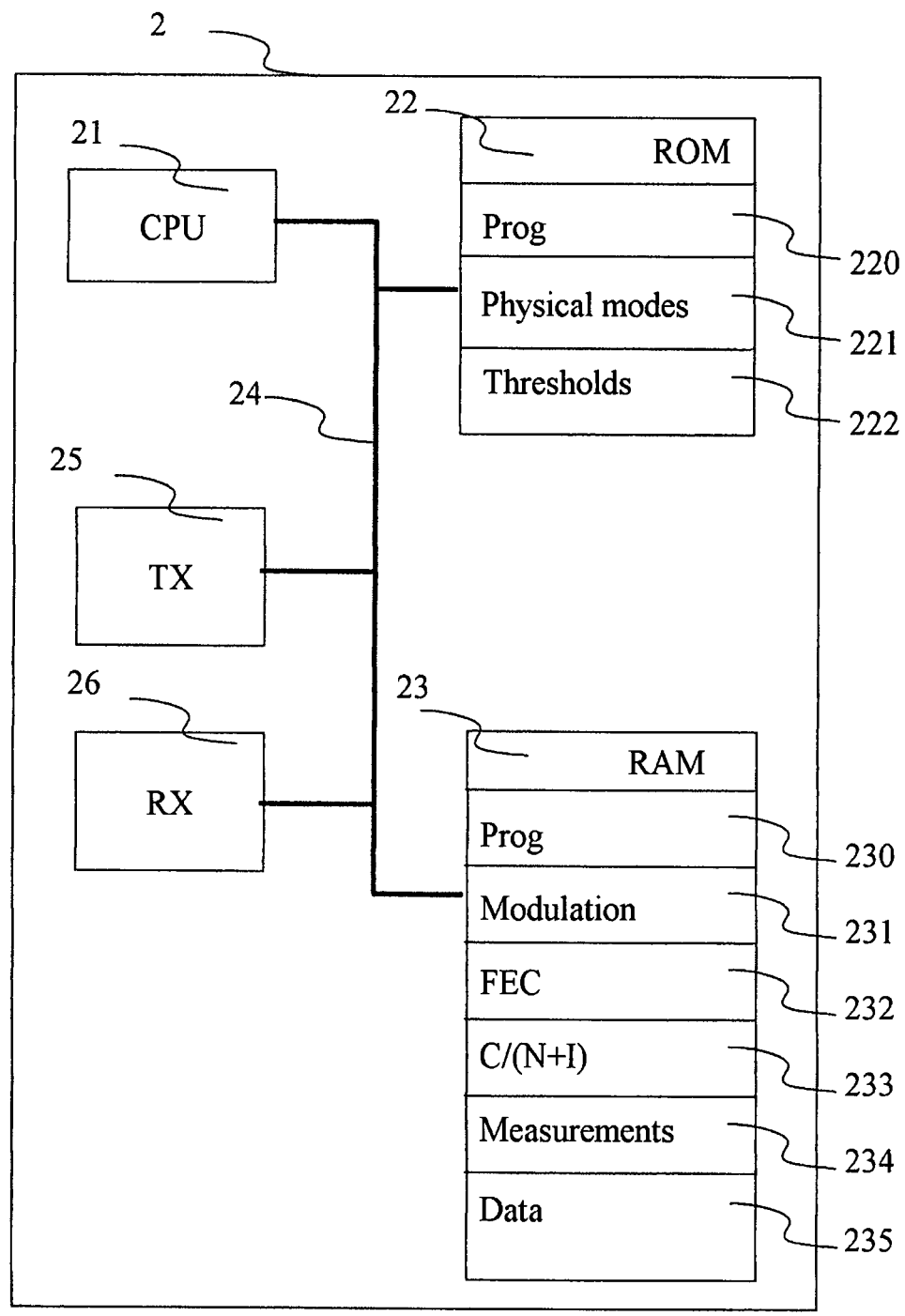
Figure 3:
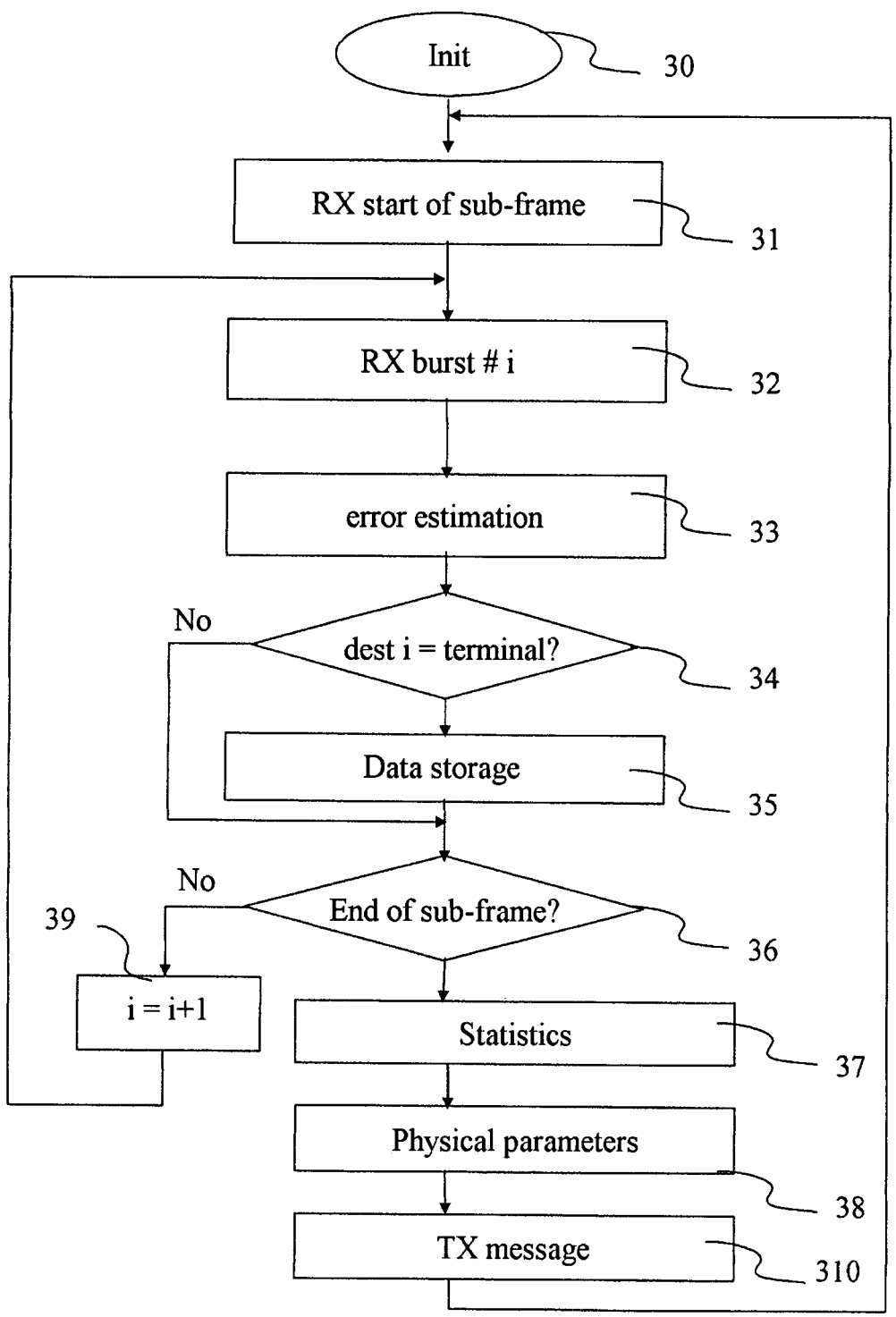
Figure 5:
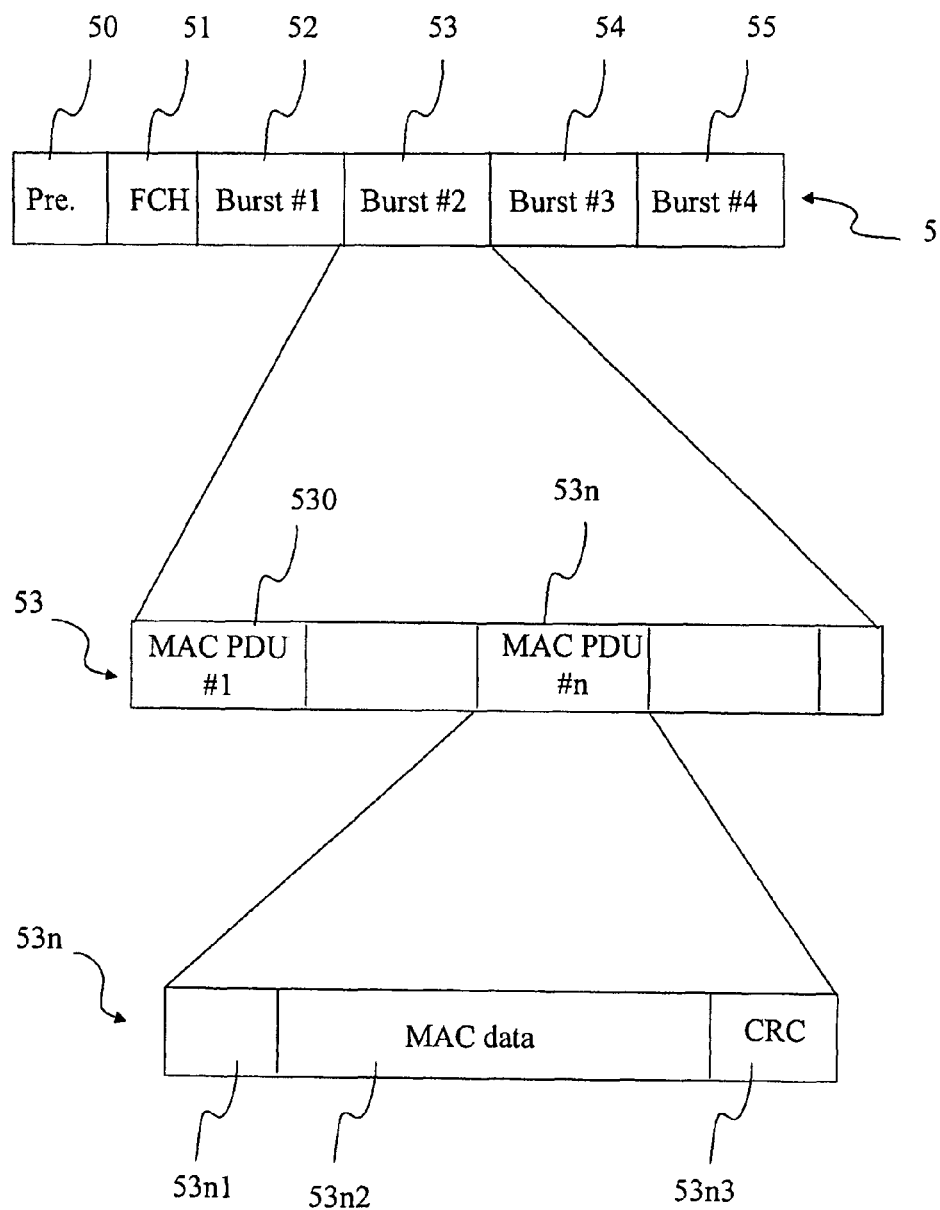

The invention will be better understood, and other features and advantages will appear on reading the description which follows, the description referring to the appended drawings among which:

FIG. 1 represents a communication network according to a particular embodiment of the invention;

FIG. 2 schematically illustrates an apparatus of the communication network of FIG. 1, according to a particular embodiment of the invention;

FIGS. 3 to 4 present a method respectively of reception and of transmission implemented in elements of the network of FIG. 1; and FIG. 5 illustrates a downlink sub-frame transmitted in the network of FIG. 1.

5. DETAILED DESCRIPTION OF THE INVENTION

According to the prior art, the link adaptation is performed as a function of data received by a local communication node. According to the invention, conversely, the local communication node uses MAC level packets ("Medium Access Channel", which corresponds to level II of the ISO communication layers of the OSI and is located immediately above the physical layer) which are not intended for it so as to obtain complementary cues regarding the quality of the link that may be associated with several types of communication parameters. Thus, the local node can benefit from relatively rich statistics which correspond to recent and numerous measurements, even when the local node receives little data. Furthermore, the local node can implement a prediction of the quality on various physical modes used for communications to other nodes. In this way, the stations (or nodes) are no longer aware only of the quality of the link on the physical mode that they use but also on other physical modes used.

FIG. 1 presents a communication network 1 according to a particular embodiment of the invention. The network 1 comprises a base station 10 and subscriber stations (or SS) 11 to 13 which correspond to terminals. The base station 10 transmits downlink sub-frames to the SSs 11 to 13. It receives uplink sub-frames from the SSs 11 to 13. The exchanges are done in accordance with an IEEE 802.16 (or WiMax®) protocol.

FIG. 5 illustrates a downlink sub-frame 5 transmitted by the BS 10 and comprising:
a preamble 50;
a header 51 which describes the start of the sub-frame 5;
a burst 52 transmitted which describes the remainder of the sub-frame 5;
a succession of bursts 53 to 55 intended respectively for the SSs 11 to 13.

According to the IEEE 802.16 standard, there is provision for several physical modes (that is to say association of a modulation (on OFDM or "Orthogonal Frequency Division Multiplexing") and of an error correcting code (or FEC="Forward Error Correction") making it possible to choose a spectral efficiency (that is to say the number of useful bits transmitted per second and per hertz). Thus, the bursts 53 to 55 are ordered by physical mode from the most robust to the least robust. The header 51 is, for example, modulated in accordance with a BPSK modulation (or "Binary Phase Shift Keying" or two-phase modulation) with a corrector code with a rate ½, the corresponding physical mode being denoted BPSK1/2. The burst 52 (respectively 53) is, for example, modulated in accordance with a QPSK modulation (or "Quaternary Phase Shift Keying" or four-phase modulation) with a corrector code with a rate ¾ (respectively ½), the corresponding physical mode being denoted QPSK¾ (respectively QPSK½). The burst 54 (respectively 55) is, for example, modulated in accordance with a QAM modulation (or "Quadrature Amplitude Modulation" or sixteen-state, respectively sixty-four state, phase quadrature amplitude modulation) with a corrector code with a rate ¾ (respectively ½), the corresponding physical mode being denoted 16 QAM¾ (respectively 64QAM½).

Each burst 53 to 55 groups together several PDUs ("Protocol Data Unit") of MAC level (or MAC PDUs). Thus, burst 53 groups together several MAC PDUs 530, . . . , 53$n$, . . . . Each MAC PDU comprises a header 53$n$1, useful data 53$n$2 (or "payload data") and a CRC 53$n$3 ("Cyclic Redundancy Check"). The CRC makes it possible to check whether the packet is in error. The MAC PDUs themselves comprise useful data to be transmitted and associated with MSDUs ("MAC Service Data Unit").

According to the IEEE 802.16 standard in its 2004 or 2005 version, the modulation is determined as a function of a ratio C/(N+I) where C represents the power of the useful signal received, N the noise level and I the interference level. The measurement of the ratio C/(N+I) is made on receipt of a burst intended for the terminal which performs this measurement.

According to the invention, the measurement of the ratio C/(N+I) is also made on receipt of a burst intended for the terminal which performs this measurement and on receipt of bursts intended for the other terminals.

FIG. 2 schematically illustrates an apparatus 2 corresponding to one of the terminals 11 to 13.

The apparatus 2 comprises, linked together by an address and data bus 24, also transporting a clock signal:
a microprocessor 21 (or CPU);
a nonvolatile memory of ROM type ("Read Only Memory") 22;
a random access memory or RAM ("Random Access Memory") 23;
a module 25 for transmitting a signal on the wireless link; and
a module 26 for receiving a signal on the wireless link.

Moreover, each of the elements 21 to 27 is well known to the person skilled in the art. These common elements are not described here.

It is observed that the word "register" used in the description designates in each of the memories mentioned, both a memory area of small capacity (a few binary data items) and also a memory area of large capacity (making it possible to store an entire program or all or part of the data representative of an audio/video service received).

The ROM memory 22 comprises in particular:
a program "prog" 220;
preprogrammed physical modes 221; and
threshold values 222.

The algorithms implementing the steps of the method described hereafter are stored in the ROM memory 22 associated with the apparatus 2 implementing these steps. On power-up, the microprocessor 21 loads and executes the instructions of these algorithms.

The random access memory 23 comprises in particular:
in a register 230, the program for operating the microprocessor 21 loaded on power-up of the apparatus 23;
a cue representative of the physical mode and in particular of the modulation in a register 231 and of the rate or type of error correcting code in a register 232;
an estimated value of C/(N+I) in a register 233
results of reception quality measurements in a register 234;
data received or to be transmitted in a register 235.

FIG. 3 schematically illustrates a downlink sub-frame reception algorithm, implemented in the apparatus 2.

In the course of a first step 30, the apparatus 2 initializes its various components and variables.

Then, in the course of a step 31, the apparatus 2 receives the start of a downlink sub-frame 5 and decodes the preamble 50 and the header 51. In the course of this step, the apparatus 2 initializes a variable corresponding to a rank of current burst (rank 0 corresponding to burst 52). The header 51 comprises a descriptor of the first four bursts while the first burst 52 comprises a descriptor of the subsequent bursts. Thus, the apparatus 2 extracts from the header 51, the cues representative of the modulation and coding (physical mode) of the first four bursts as well as their length, and stores them.

Thereafter, in the course of a step 32, the apparatus 2 receives a burst of rank corresponding to the current burst.

Then, in the course of a step 33, the apparatus 2 demodulates and decodes the burst depending on its physical mode. If it is the first burst 52, the apparatus 2 extracts therefrom the cues representative of the physical mode of the bursts according to the fourth burst as well as their length, and stores them. The apparatus 2 stores, in the register 234, the result of a measurement of quality of reception of the burst received associated with the CRC after decoding (number of MAC PDUs received properly, that is to say correct CRC after FEC decoding and/or number of MAC PDUs received badly, that is to say false CRC after FEC decoding), while associating it with the physical parameters of the current burst (as stored during reception of the header 51 and the first burst 52). This step 32 is performed even if the current burst is not intended for the apparatus 2. This implementation is relatively simple and makes it possible to have very complete measurement data. In the course of step 33, the number of PDUs received properly and/or received badly (and possibly the total number of PDUs received) is stored as a function of the physical parameters for each frame, so as to have to keep the age of the measurements. Thus, for example, the apparatus 2 increments a counter of properly received PDUs and/or a counter of badly received PDUs, each counter being associated with a (modulation, FEC) pair (FEC representing here a rate and/or a type of FEC) and with a measurement time-stamp. Advantageously, a sliding time window is employed to store the measurements; thus, the most recent measurements overwrite the oldest measurements (thereby making it possible to have up-to-date (and not obsolete) measurements and to limit the necessary memory size). According to a variant, the counters corresponding to a time-stamp older than a predetermined time-stamp (for example 100 ms or a few hundred milliseconds to several seconds depending on the speed of fluctuation of the channel) are erased. According to another variant, the counters are associated with numbers of properly received PDUs and/or with numbers of badly received PDUs (without being associated with a time-stamp). Advantageously, according to this variant, the counters are set to zero periodically (for example every 200 ms) so as to avoid having obsolete measurements.

According to a variant, measurements are performed only on the bursts corresponding to a subset of the available physical parameters, certain physical parameters not necessarily being implemented by the apparatus 2 (for example if the throughput offered by a given modulation/FEC rate is too high or too low for an application implemented in the apparatus 2).

According to the embodiment described previously, if the MAC header of a PDU at the start of a burst is badly received, the terminal does not decode the remainder of the burst and goes to the next burst. According to a variant, if the MAC header of a MAC PDU at the start of a burst is badly received, the terminal implements a technique of decoding the remainder of the burst by resynchronizing itself in an arbitrary manner (for example according to the technique described in the French patent application registered under the reference 0650841 but not published to date and which envisages a resynchronization to error check fields of the HCS ("Header Check Sum") or CRC type; according to the technique described in this document, when packet level synchronization is lost in a MAC PDU, resynchronization is effected by searching for known data in the burst and/or by checking whether, in a sliding window of length corresponding to a MAC PDU length, data received satisfies a CRC or HCS condition).

Then, in the course of a test 34, the apparatus 2 checks whether at least one MAC PDU of the current burst is intended for the apparatus 2.

In the affirmative, in the course of a step 35, the apparatus 2 transmits the decoded MAC PDUs, arising from the current burst and intended for the apparatus 2, to an application or stores them in the register 235.

In the negative or after step 35, in the course of a test 36, the apparatus 2 checks whether the current burst is the last burst of the sub-frame 5.

In the negative, in the course of a step 39, the apparatus 2 points to the next burst which becomes a new current burst and step 32 is repeated.

In the affirmative, in the course of a step 36, the apparatus 2 calculates statistics based on the measurements recorded in the course of step 33.

Thereafter, in the course of a step 37, the apparatus calculates for each (modulation, FEC) pair a packet error rate or PER by taking into account all the counters associated with this pair and updated during step 33.

Then, in the course of a step 38, the apparatus 2 determines a (modulation, FEC) pair whose PER (calculated during step 37) is less than a PER threshold (for example requested by an application or determined by parametrization during the initialization step 30). When several (modulation, FEC) pairs have a required PER, the pair ensuring the highest throughput is advantageously chosen. When no pair has the required PER, the most robust pair is chosen.

According to the IEEE 802.16 standard, for each pair of physical parameters, a high threshold and a low threshold of ratio C/N+I is defined. When the ratio C/N+I measured for the current physical parameters is outside the permitted range, a message containing the value of C/N+I is transmitted to the base station so as to change physical parameters. According to the invention, a ratio C/N+I depending on the desired (modulation, FEC) pair is transmited.

Thereafter, in the course of a step 310, the apparatus 2 deduces from the measurements performed, a ratio C/(N+I) representative of the quality of the link by converting the statistics into a value of C/(N+I) compatible with the IEEE 802.16 standard. Thus, with each possible (modulation, FEC) pair, the apparatus 2 matches a value C/N+I lying between the low and high thresholds defined for these physical parameters. By way of illustration, if a 16QAM½ modulation is desired and if the low and high thresholds are respectively −78 dBm and −73 dBm, to impose these physical parameters, the apparatus 2 transmits a message with, for example, C/N+I equal to −75 dBm (this value not being in the ranges authorized for the other modulations).

Then, the apparatus 2 transmits this value C/(N+I) to the base station 10 by transmitting a message of the type RNG-REQ ("Ranging Request") or DBPC-REQ ("Downlink Burst Profile Change request") during the maintenance intervals provided for this purpose according to the IEEE802.16 standard (the transmission of a data item of the type C/N+I making it possible to preserve compatibility with the IEEE802.16 standard). The base station 1 acknowledges a new burst profile. According to the IEEE802.16 standard, a profile is determined by a (modulation, FEC) pair and associated low and high thresholds C/N+I.

According to a variant embodiment (for example for a communication that is not compatible with the 2004 or 2005 version of IEEE802.16 or a communication according to a proprietary protocol), step 310 is replaced with a step of transmitting a message (from the terminal to the base station) comprising the desired physical parameters or the PER (for each pair) or the statistics. If the terminal transmits the statistics or the PER for each pair, the base station determines the optimum physical parameters (possibly taking account of the constraints associated with the global network (in particular available bandwidth)).

Then, step 31 is repeated.

According to the IEEE802.16 standard (in its 2004 or 2005 version), a terminal transmits a value of C/(N+I) as a function of physical measurements performed on a burst intended for the terminal which performs the measurement. On the other hand, according to the invention, a terminal transmits a value of C/(N+I) deduced, in particular, from calculated statistics deduced from listening for and decoding bursts intended for other terminals.

Furthermore, according to the state of the art, the quality of reception is measured at a relatively low physical level, which does not make it possible to distinguish a disturbance related to an interferer or to a propagation channel poorly adapted to the system (for example very frequency-selective channel) (in this case, increasing the robustness of the physical mode does nothing to change the quality of reception). According to the invention, account is taken of the measurement of quality of reception at the higher level. Thus, two distinct measurements of C/N+I at the physical level before FEC decoding that give one and the same result may correspond to a very different quality of link. In a dual manner, two distinct measurements of C/N+I at the physical level before FEC decoding that give a very different result may correspond to a similar quality of link with much the same PER. A determination of the quality of the link based on the PER at the MAC level enables better adjustment of the physical parameters since it takes into account the real decoding performance. Moreover, the invention makes it possible to go down or up by several robustness levels in the physical parameters. Thus, it is possible to go from an OFDM-based modulation of the type 64QAM½ to QPSK¾ (or vice versa) without going through an intermediate 16QAM½ modulation.

FIG. 4 schematically illustrates a downlink sub-frame transmission algorithm, implemented in the base station 10.

In the course of a first step 40, the base station 10 initializes its various components and variables. In the course of this step, physical mode parameters are defined by default.

Then, in the course of a step 41, the base station 10 receives an uplink frame from a terminal with a ratio value C/(N+I). This ratio can be calculated in accordance with procedures known per se or be estimated in accordance with the invention, as presented previously. The base station 10 deduces corresponding physical mode parameters therefrom (based only on the mode corresponding to the ratio C/N+I transmitted by the terminal). These parameters are, for example, stored in a table and their values are determined as a function of a predetermined interval C/(N+I) to which the value C/(N+I) received belongs. According to a variant, the base station also takes into account the ratios of all or some of the other terminals so as to allocate each one a mode that makes it possible to optimize the global bandwidth.

According to a variant of step 41, the base station 10 receives an uplink frame from a terminal a message comprising the desired physical parameters or the PER (for each pair) or the statistics. The base station then fixes the physical mode for the corresponding terminal as a function of these data (possibly taking into account the data of C/N+I, PER, statistics and/or particular physical mode request transmitted by the other terminals). When the base station receives an uplink frame comprising statistics, it calculates a packet error rate for each (modulation, FEC) pair. When the base station receives an uplink frame comprising the PER or has calculated a PER, it determines a (modulation, FEC) pair whose PER is less than a determined PER threshold (for example by parametrization on the basis or otherwise of the type of terminal).

Thereafter, in the course of a step 42, the MAC layer of the base station receives from a higher layer, a request to transmit data to a terminal.

Then, in the course of a step 43, the base station 10 constructs one or more bursts containing the data to be transmitted as a function of the physical mode parameters associated with the destination terminals. The burst or bursts are then inserted into downlink sub-frames so as to be transmitted to their destination and allow other terminals to make measurements of quality of transmission as a function of the corresponding physical mode parameters. Step 41 is thereafter repeated.

Of course, the invention is not limited to the embodiments described above.

In particular, neither is the invention limited to the transmission of data in accordance with a wireless communication standard (for example IEEE802.16) but relates also to all transmissions on any medium, and in particular on noisy wire-based channels or on a recording channel. The invention applies not only to centralized networks with a master station or base station but also to networks where a terminal can receive data bursts originating from several stations with several physical modes. According to this configuration, the terminal receives the packets sent by all or some of the stations, including the bursts which are not intended for it and estimates the packet error rate for all or some of the physical modes as a function of each sending station.

The invention is compatible with numerous applications. It makes it possible in particular to undertake variable video coding or SVC ("Scalable Video Coding" (such a possibility exists in the MPEG4 video standard); according to an SVB, it is possible to undertake high-definition video if the throughput is good (that is to say if the spectral efficiency is high, this corresponding to a high-rate modulation (for example 64QAM) and a low FEC rate) and single-definition if the throughput is lower (for example 8PSK).

According to certain embodiments, the invention also makes it possible to enhance the reliability of the link.

The invention uses error detection at packet level advantageously at MAC level or in the higher layers which can be based on any error detection procedure. According to a variant, packet error detection can also be based on the verification of an FEC (for example the number of false bytes detected by a Reed-Solomon decoder or metric given by a Viterbi decoder).

The application of the invention to transmissions of data modulated in accordance with a modulation based on OFDM is particularly advantageous, since the data are transmitted along a broadband channel which may be very frequency-selective. Nevertheless, the invention also applies to modulations of the spread spectrum or narrowband type.

According to various implementations of the invention, the type of modulation (for example PSQK, QPSK, 8PSK, 16QAM, 32QAM, 64QAM associated or otherwise with an OFDM modulation) and/or the rate of the error correcting code considered (for example ½ or ¾) and/or the type of error correcting coding (Reed-Solomon, Convolutional code or turbo-code, for example) are considered among the physical parameters for which the error rate is estimated.

The invention claimed is:

1. A method of communication adapted to the transmission of data packets that can be transmitted according to various physical modes, wherein the method comprises:
   receiving a sub-frame comprising a plurality of bursts, each burst being associated with a different physical mode;
   determining a packet error rate for each physical mode associated with said bursts, the determination being based on at least a burst of said plurality of bursts comprising at least a first MAC level packet intended for the apparatus performing the determination and on at least a burst of said plurality of bursts comprising at least a second MAC level packet not intended for said apparatus; and
   selecting a physical mode based on the determined packet error rate.

2. The method according to claim 1, wherein at least some of the packets received are not intended for the apparatus that receives the said packets and determines the packet error rate on the basis of the said packets.

3. The method according to claim 1, wherein the said physical mode comprises the modulation.

4. The method according to claim 1, wherein the said physical mode comprises the rate or the type of an error correcting code.

5. The method according to claim 1, wherein the determination of the error rate comprises an error detection code verification step.

6. The method according to claim 5, wherein it comprises a step of transmitting a cue representative of the said packet error rate for at least some of the physical modes of the said set, the said cue representative of the said rate being transmitted to a station that is able to send radio bursts.

7. The method according to claim 1, further comprising determining statistical data regarding error rates for packets received on the basis of the said determination of the said packet error rate and of at least one parameter associated with a physical mode.

8. The method according to claim 7, further comprising transmitting cues representative of the said statistical data, the said cues representative of the said statistical data being transmitted to a station that is able to send radio bursts.

9. The method according to claim 1, further comprising determining a signal-to-noise ratio on the basis of the said determination of the said packet error rate and of at least one parameter associated with a physical mode.

10. The method according to claim 9, further comprising transmitting data representative of a signal-to-noise ratio for at least some of the physical modes of the said set, the data representative of a signal-to-noise ratio being transmitted to a station that is able to send radio bursts.

11. The method according to claim 1, wherein the said transmission of data packets is performed in accordance with a protocol of the IEEE 802.16 type.

12. The method according to claim 1, further comprising transmitting a physical mode modification request for the transmission of data packets.

13. A communication device adapted to the reception of data packets that can be transmitted according to various physical modes, wherein the communication device comprises:
    a receiver configured to receive a sub-frame comprising a plurality of bursts, each burst being associated with a different physical mode;
    a processor configured to determine the packet error rate for each physical mode associated with said bursts, the determination being based on at least a burst of said plurality of bursts comprising at least a first MAC level packet intended for the apparatus performing the determination and on at least a burst of said plurality of bursts comprising at least a second MAC level packet not intended for said apparatus, the processor being further configured to select one of the physical modes based on the determined packet error rate.

14. The communication device according to claim 13, wherein at least some of the packets received are not intended for the apparatus performing the determination of the packet error rate on the basis of the said packets.

15. The communication device according to claim 13, wherein said physical mode comprises the modulation.

16. The communication device according to claim 13, wherein said physical mode comprises the rate or the type of an error correcting code.

17. The communication device according to claim 13, wherein the processor is further configured to verify an error detection code.

18. The communication device according to claim 13, further comprising a transmitter configured to transmit a cue representative of said packet error rate for at least some of the physical modes of said set, said cue representative of said rate being transmitted to a station that is able to send radio bursts.

19. The communication device according to claim 13, wherein the processor is further configured to determine statistical data regarding error rates for packets received on the basis of said determination of said packet error rate and of at least one parameter associated with a physical mode.

20. The communication device according to claim 19, further comprising a transmitter configured to transmit cues representative of said statistical data, said cues representative of said statistical data being transmitted to a station that is able to send radio bursts.

21. The communication device according to claim 13, wherein the processor is further configured to determine a signal-to-noise ratio on the basis of the determination of said packet error rate and of at least one parameter associated with a physical mode.

22. The communication device according to claim 21, further comprising a transmitter configured to transmit data representative of a signal-to-noise ratio for at least some of the physical modes of said set, the data representative of a signal-to-noise ratio being transmitted to a station that is able to send radio bursts.

23. The communication device according to claim 13, wherein said transmission of data packets is performed in accordance with a protocol of the IEEE 802.16 type.

24. The communication device according to claim 13, further comprising a transmitter configured to transmit a physical mode modification request for the transmission of data packets.

25. A communication device adapted to the reception of data packets that can be transmitted according to various physical modes, wherein the communication device comprises:
    a receiver configured to receive a sub-frame comprising a plurality of bursts, each burst being associated with a different physical mode;
    a processor configured to determine the packet error rate for each physical mode associated with said bursts, the determination being based on at least a burst of said plurality of bursts comprising at least a first MAC level packet intended for the apparatus performing the determination and on at least a burst of said plurality of bursts comprising at least a second MAC level packet not intended for said apparatus, and the processor configured to select one of the physical modes based on the determined packet error rate.

* * * * *